United States Patent [19]

Ukaji et al.

[11] 3,925,263

[45] Dec. 9, 1975

[54] PROCESS FOR PREPARING POLYCARBONMONOFLUORIDE

[75] Inventors: Rokuo Ukaji, Ibaraki; Tutomu Kamihigoshi, Takatsuki; Kenji Mikami; Shoji Takaki, both of Settsu, all of Japan

[73] Assignee: Daikin Kogyo Co., Ltd., Osaka, Japan

[22] Filed: June 11, 1974

[21] Appl. No.: 478,365

[30] Foreign Application Priority Data

June 11, 1973 Japan.............................. 48-66036

[52] U.S. Cl.................. 260/2 H; 423/439; 423/489
[51] Int. Cl.$^2$............................................ C01B 7/19
[58] Field of Search................................... 260/2 H

[56] References Cited
UNITED STATES PATENTS 3,607,747   9/1971   Ishikawa et al..................... 260/2 H

*Primary Examiner*—Wilbert J. Briggs, Sr.
*Attorney, Agent, or Firm*—Armstrong, Nikaido & Wegner

[57] ABSTRACT

In a process for preparing polycarbonmonofluoride by reacting carbon materials with fluorine gas, perfluorocarbons having carbon atoms of 4 to 8 are employed as a diluent of fluorine gas. The employment of perfluorocarbons having carbon atoms of 4 to 8 as diluent of fluorine gas can give polycarbonmonofluoride at a high formation rate as well as in a good yield, the generation of by-products being remarkably suppressed.

11 Claims, No Drawings

PROCESS FOR PREPARING POLYCARBONMONOFLUORIDE

BACKGROUND OF THE INVENTION

The present invention relates to a novel process for preparing polycarbonmonofluoride, particularly to an improved process for preparing polycarbonmonofluoride which is characterized by employing perfluorocarbons having carbon atoms of 4 to 8 as diluent of fluorine gas.

Recently, polycarbonmonofluoride has become the object of public attention as a new industrial material and has been applied to various uses, for instance, as an active material for primary cells of high energy density, as a solid lubricant to be incorporated in liquid lubricants, greases and coating compositions, as a fluorinating agent, and the like. Therefore, the demand for polycarbonmonofluoride has increased and there has been desired the mass-production of polycarbonmonofluoride.

Polycarbonmonofluoride is prepared by reacting carbon materials with fluorine gas, for instance, as described by O. Ruff and O. Bretschneider, in Z. anorg. u. allg. Chem. 217, 1 (1934) and W. Rudorff and O. Rudorff, in Z. anorg. u. allg. Chem. 253,281 (1947). For the reason of the high reactivity of fluorine gas, in a conventional process, fluorine gas employed was usually diluted with an inert gas such as nitrogen, helium, argon, neon and carbon dioxide, as described in U.S. Pat. No. 3,397,087, Column 3, lines 6 to 9 and U.S. Pat. No. 2,786,874, Column 3, lines 10 to 22.

However, in conventional process, the reaction heat was not efficiently eliminated by such diluents as in the above. Therefore, a great amount of diluent was employed in order to sufficiently eliminate the reaction heat, to make easy the control of reaction and to suppress side reactions resulting from the degradation of polycarbonmonofluoride formed. As a result, the formation rate of polycarbonmonofluoride decreased extremely to reduce the reaction efficiency. In addition, nevertheless the employment of a great amount of diluent, it was difficult to suppress sufficiently the generation of perfluorocarbons (mainly consisting of those having carbon atomes of 1 to 8) as by-products.

OBJECTS OF THE INVENTION

An object of the present invention is to provide a process for preparing polycarbonmono in which polycarbonmonofluoride is obtained in a high yield with a high efficiency, the generation of by-products being suppressed.

Further object of the invention is to provide a process suitable for the mass-production of polycarbonmonofluoride.

These and other objects of the invention will become apparent from the description hereinafter.

DETAILED DESCRIPTION OF THE INVENTION

It has now been found that the above-mentioned objects are readily accomplished by reacting carbon materials with fluorine gas diluted with perfluorocarbons having carbon atoms of 4 to 8.

According to the present invention employing perfluorocarbons having carbon atoms of 4 to 8 as diluent of fluorine gas, the reaction heat can be efficiently eliminated and the control of the reaction can be made easily. Accordingly, even if the reaction is carried out at a low dilution ratio of fluorine gas, the generation of perfluorocarbons resulting in the loss of fluorine and carbon can be sufficiently suppressed. As a result, the reaction can be carried out at a low dilution ratio of fluorine gas without increasing generation of by-products and thereby polycarbonmonofluoride is formed at a high formation rate to increase the yield per unit time.

The above-mentioned characteristics of the present invention are more effectively exhibited in case of circulating and reusing the diluent of the present invention since the diluent employed is thermally and chemically stable and can be readily liquefied. That is to say, in case of employing circularly perfluorocarbons having carbon atoms of 4 to 8, the perfluorocarbons having carbon atoms of 4 to 8 among those formed by side reaction can be effectively reused.

Perfluorocarbons having carbon atoms of 4 to 8 employed as a diluent of fluorine gas in the present invention are compounds which have a boiling point of from $-5°$ to $110°C$. and are gaseous under a reaction condition adopted in the present invention and liquid under an ordinary temperature and pressure or readily condensable, and have a high thermal-stability and a high specific heat. Examples of the perfluorocarbons include perfluorobutane, perfluoropentane, perfluorocyclopentane, perfluorohexane, perfluorocyclohexane, perfluoroheptane and perfluorooctane. Among these perfluorocarbons, n-perfluoropentane, (b.p.: $29°C.$), perfluorocyclopentane (b.p.: $23°C.$), n-perfluorohexane (b.p.: $58°C.$), perfluorocyclohexane (b.p.: $50°C.$) and n-perfluoroheptane (b.p.: $82°C.$) are more preferably employed since they are more thermally stable and can be more readily handled in thier circular use. Perfluorocarbons having carbon atoms of not more than 3 are not preferable since the above-mentioned advantages of the present invention are not sufficiently achieved by them and perfluorocarbons having carbon atoms of not less than 9 are not also preferable since they are unstable at a reaction temperature adopted in the present invention due to their low thermal-stability and hard to handle as diluents due to their high boiling point. These perfluorocarbons are, generally, employed singly but more than two of them may be employed in combination, in case of need.

As described above, advantages of the present invention more effectively exhibited in case these perfluorocarbons are employed circularly in the reaction system. That is to say, in case of employing circularly perfluorocarbon having carbon atoms of 4 to 8, the perfluorocarbons having carbon atoms of 4 to 8 among those formed as by-products by side reactions can be effectively reused. In that case the by-produced perfluorocarbons except those having carbon atoms of 4 to 8 may be also employed circularly together with the perfluorocarbons having carbon atoms of 4 to 8 since the amounts of them are not so such that the diluent of the present invention is influenced badly. Generally, however, low boiling compounds in the by-products such as perfluoroethylene (b.p.: $-78°C.$) and perfluoromethane (b.p.: $-128°C.$) which are not effective as a diluent in the present invention are removed. Since the diluent of the present invention can be readily liquefied, such low boiling compounds are readily removed from the diluent of the present invention by liquefying the residual gas of reaction by cooling. On the other hand, the amounts of high boiling compounds being thermally unstable are negligibly small, but it is also preferable to remove them. In conventional process carried out in fluidized bed process, the finely divided polycarbonmonofluoride introduced in the residual gas of the reaction had to be recovered by means of conventional dust collectors such as bag filter and cyclone, but, according to the present invention, such finely divided polycarbon-monofluoride can be readily recovered in the course of the liquefiction of the diluent of the present invention from the residual gas for its circular use without employing dust collector.

The carbon material employed in the practice of the instant process is not critical and may be either amorphous or crystalline. Examples of the carbon material include amorphous carbons such as carbon black, petroleum coke, petroleum pitch coke and charcoal, and crystalline carbons such as natural graphite and artificial graphite. Such carbon materials can be employed in various forms such as powders, blocks, spheres, bars and fibers.

Fluorine gas employed in the present invention is prepared by the electrolysis of a solution of KF.2HF electrolyte. The fluorine gas may be employed as it is, but hydrogen fluoride therein is usually removed by a conventional manner. The fluorine gas charged in a bomb which is commercially available can be also employed.

The process of the present invention, generally is carried out by contacting a carbon material with a gas mixture consisting of fluorine gas and perfluorocarbon having carbon atoms of 4 to 8, which are usually mixed prior to contact with the carbon material. In that case, a ratio of fluorine gas and perfluorocarbon in the gas mixture is not critical and may vary appropriately, depending on another reaction conditions, for instance, reaction temperature and flow rate of the gas mixture. Generally, however, a partial pressure of fluorine gas in the gas mixture is from 0.6 to 0.01, preferably from 0.4 to 0.1, since the reaction proceeds at a proper reaction rate, suppresses the generation of by-products and gives polycarbonmonofluoride in a high yield. When the partial pressure of fluorine gas is more than 0.6, it is difficult to eliminate the reaction heat since the reaction rate is too large, and thereby the amounts of perfluorocarbons by-produced increase. When the partial pressure of fluorine gas is less than 0.01, the reaction efficiency is reduced since the reaction rate is too small.

The reaction is carried out, preferably, at a temperature in the range of from 250° to 600°C. More preferable range of reaction temperatures is from 300° to 500°C. In case the reaction temperature is less than 250°C., the reaction rate is too small and in case the reaction rate is too large so that the amounts of perfluorocarbons by-produced increase greatly. As a result, in these cases, the yield of polycarbonmonofluoride is reduced extremely. Further, most preferable temperatures employed depend on a kind of particular carbon materials and vary within the above-mentioned temperature range. Generally, with respect to the amorphous carbon, reaction temperature is preferably in a range from 300° to 400°C. and with respect to the crystalline carbon, reaction temperature is preferably in a range from 400° to 500°C.

In the preferred embodiment of the present invention, the combination of a reaction temperature from 250° to 600°C. and a partial pressure of fluorine gas from 0.6 to 0.01 is employed since polycarbonmonofluoride is obtained in a higher yield, the total amount of byproducts being more reduced.

As the reaction pressure of the present invention, generally, normal pressure is employed. In case of need, either elevated pressures or reduced pressures may be employed.

The reactor employed in the present invention is not limited to a particular one so long as it can be employed for the reaction between solid and gas at an elevated temperature. Preferred examples of the reactors include fluidized bed-type reactors, rotary kiln-type reactors and tray tower-type reactors. As a kind of material of reactors, Monel metal, nickel or copper is employed in consideration of the corrosion by fluorine gas.

The process of the present invention is also effectively applicable to the fluorination of a part of carbon material, especially, only the neighborhood of the surface thereof.

The process of the present invention, which is characterized by employing specific perfluorocarbons having carbon atoms of 4 to 8 as a diluent of fluorine gas instead of such inert gases, for instance, nitrogen, as employed in conventional processes, is excellent for the mass-production of polycarbonmonofluoride and extremely preferable for an industrial purpose.

The process of the present invention is more particularly described and explained by means of the following illustrative Examples.

Examples 1 to 4 and Comparative Examples 1 to 4

On a dish made of Monel metal which is located approximately in the center of a cylindrical reactor was placed a desired amount of a carbon material so that the thickness of carbon layer becomes uniform.

The reactor was heated by a band heater wound on outer side wall thereof and the inner temperature of the reactor was regulated to a desired temperature by means of an automatic temperature controller connected to the band heater.

A gas mixture of fluorine gas and diluent (in Examples 1 to 3, n-perfluoropentane; in Example 4, n-perfluorohexane; in Comparative Examples 1, 2 and 4, nitrogen gas; in Comparative Example 3, perfluoromethane) in which fluorine gas possessed a desired partial pressure was introduced into the reactor through the inlet of gas, located in the lower part thereof and allowed to contact with the carbon material for a desired period. The fluorine gas was employed after hydrogen fluoride therein was removed by trichlene-dry ice trap and NaF tower. n-Perfluoropentane and n-perfluorohexane employed as diluent in Examples 1 to 3 and Example 4, respectively, were mixed with fluorine gas after vaporized because they are liquid at an ordinary temperature (n-perfluoropentane: b.p. 29°C., n-perfluorohexane: b.p. 58°C.).

After the completion of reaction, the yield of the solid product obtained was determined. Further, the content of fluorine in the solid product was determined by elementary analysis and the recovery rate of carbon was calculated from the following equation.

$$\text{Recovery rate of carbon (\% by weight)} = \frac{\text{Yield of solid product (g.)} \times \left(1 - \frac{\text{Content of fluorine in solid product (\% by weight)}}{100}\right)}{\text{Amount of carbon material supplied as a starting material (g.)}} \times 100$$

On the other hand, the amount of the perfluorocarbons having carbon atoms of 1 to 8 by-produced were determined by analyzing the residual gas of the reaction by gas chromatography. In that case, the amount of the perfluorocarbons having carbon atoms of 1 to 8 by-produced is the amount of the perfluorocarbons having carbon atoms of 1 to 8 except n-perfluoropentane with respect to Examples 1 to 3, the amount of the perfluorocarbons having carbon atoms of 1 to 8 except n-perfluorohexane with respect to Example 4 and the amount of the perfluorocarbons having carbon atoms 2 to 8 with respect to Comparative Example 4, respectively. Then, the amount of carbon contained in the perfluorocarbons having carbon atoms of 1 to 8 by-produced was calculated from the amount of the perfluorocarbons having carbon atoms of 1 to 8 by-produced which is defined as above and the by-production rate of perfluorocarbons having carbon atoms of 1 to 8 was calculated from the following equation.

By-production rate of perfluorocarbons of $C_1$ to $C_8$ (% by weight) = $\dfrac{\text{Amount of carbon contained in perfluorocarbons of } C_1 \text{ to } C_8 \text{ by-produced (g.)}}{\text{Amount of carbon material supplied as starting material (g.)}} \times 100$ Further, in Examples 1 to 2, the by-production rate of perfluorocarbons having carbon atoms of 4 to 8 was determined in the same manner as in the above.

The results are shown in Table 1. In Table 1, the carbon material A is an amorphous carbon having a particle size less than 43 $\mu$ and the carbon material B is a crystalline carbon (artificial graphite) having a particle size less than 38 $\mu$.

Table 1

| Example No. | Reaction condition | | | | Carbon material | |
|---|---|---|---|---|---|---|
| | Partial pressure of fluorine gas | Diluent | Temperature (°C.) | Reaction time (minutes) | Kind | Amount supplied (g.) |
| 1 | 0.15 | n-perfluoropentane | 350 | 140 | A | 0.1005 |
| 2 | 0.15 | n-perfluoropentane | 460 | 140 | B | 0.1000 |
| Comparative Example 1 | 0.15 | nitrogen | 350 | 140 | A | 0.1003 |
| Comparative Example 2 | 0.15 | nitrogen | 460 | 140 | B | 0.1000 |
| 3 | 0.40 | n-perfluoropentane | 350 | 60 | A | 0.1003 |
| 4 | 0.30 | n-perfluorohexane | 350 | 60 | A | 0.1001 |
| Comparative Example 3 | 0.40 | nitrogen | 350 | 60 | A | 0.1002 |
| Comparative Example 4 | 0.40 | perfluoromethane | 350 | 60 | A | 0.1000 |

| Example No. | Yield of solid product (g.) | Content of fluorine in solid product (% by weight) | Recovery rate of carbon (% by weight) | By-production rate of perfluorocarbons of $C_1$ to $C_8$ (% by weight) |
|---|---|---|---|---|
| 1 | 0.2459 | 62.0 | 93.9 | 5.0 (2.7)* |
| 2 | 0.2299 | 60.5 | 90.5 | 6.5 (3.6)* |
| Comparative Example 1 | 0.2280 | 62.0 | 87.0 | 7.2 |
| Comparative Example 2 | 0.2154 | 60.0 | 86.4 | 8.1 |
| 3 | 0.2340 | 62.1 | 88.5 | 8.1 |
| 4 | 0.2442 | 62.0 | 92.1 | 5.5 |
| Comparative Example 3 | 0.1592 | 62.0 | 60.5 | 32.4 |
| Comparative Example 4 | 0.1970 | 61.9 | 75.0 | 20.0 |

*The value in parentheses is the by-production rate of perfluorocarbons of $C_4$ to $C_8$ (% by weight).

Data of Table 1 show that the employment of n-perfluoropentane and n-perfluorohexane as diluent of fluorine gas sufficiently suppress the generation of perfluorocarbons even at a low dilution ratio of fluorine gas to give polycarbonmonofluoride in a high yield in comparison with the employment of nitrogen and perfluoromethane.

What we claim is:

1. In the process for preparing polycarbonmonofluoride by the reaction of carbon materials with fluorine gas, the improvement which comprises employing as a diluent for the fluorine gas perfluorocarbon compounds having 4 to 8 carbon atoms, said reaction being conducted at a temperature in the range of from 250° to 600°C and under a partial pressure for the fluorine gas of from 0.4 to 0.1.

2. The process of claim 1, wherein said perfluorocarbon is at least one member selected from the group consisting of perfluorobutane, perfluoropentane, perfluorocyclopentane, perfluorohexane, perfluorocyclohexane, perfluoroheptane and perfluorooctane.

3. The process of claim 2, wherein said perfluorocarbon is at least one member selected from the group consisting of n-perfluoropentane, perfluorocyclopentane, n-perfluorohexane, perfluorocyclohexane and n-perfluoroheptane.

4. The process of claim 1, wherein said perfluorocarbon is employed circularly.

5. The process of claim 1, wherein said reaction is carried out at a reaction temperature from 250° to 600°C.

6. The process of claim 5, wherein said reaction temperature is from 300° to 500°C.

7. The process of claim 1, wherein said reaction is carried out under a partial pressure of said fluorine gas from 0.6 to 0.01.

8. The process of claim 7, wherein said partial pressure is from 0.4 to 0.1.

9. The process of claim 1, wherein said reaction is carried out at a reaction temperature from 250° to 600°C. and under a partial pressure from 0.6 to 0.01.

10. The process of claim 1, wherein said carbon material is selected from the group consisting of carbon black, petroleum coke, petroleum pitch coke, charcoal, natural graphite and artificial graphite.

11. The process of claim 1, wherein said reaction is carried out in a reactor selected from the group consisting of fluidized bed-type reactor, rotary kiln-type reactor and tray tower-type reactor.

* * * * *